United States Patent

[11] 3,632,363

| [72] | Inventor | Francis S. Moussalli<br>Charlotte, N.C. |
|---|---|---|
| [21] | Appl. No. | 871,965 |
| [22] | Filed | Oct. 28, 1969 |
| [45] | Patented | Jan. 4, 1972 |
| [73] | Assignee | Celanese Corporation<br>New York, N.Y.<br>Continuation-in-part of application Ser. No. 562,512, July 5, 1966, now abandoned. This application Oct. 28, 1969, Ser. No. 871,965 |

[54] CELLULOSE ACETATE AND NYLON FIBERS CONTAINING THIOREA DYESITES
8 Claims, No Drawings

[52] U.S. Cl. ................................................ 106/186, 260/45.7, 260/45.9
[51] Int. Cl. ....................................................... C08b 27/68
[50] Field of Search ............................................. 106/186; 260/552, 45.9, 45.7

[56] References Cited
UNITED STATES PATENTS
| 3,464,851 | 9/1969 | Cahill | 260/45.95 |
| 2,757,190 | 7/1956 | Jones | 260/454 |
| 2,231,892 | 2/1941 | Esselmann et al. | 28/1 |

*Primary Examiner*—Theodore Morris
*Attorneys*—Thomas J. Morgan, Stephen D. Murphy and Howard J. Greenwald ABSTRACT: There is provided a process for improving the dyeability and fading resistance of fiber, comprising mixing into said fiber prior to the time it is extruded and dried from about 0.1 to about 6 percent (by weight of fiber) of a compound of the formula

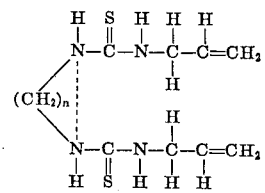

wherein $n$ is from 0 to about 18, there being a direct bond between the nitrogen atoms when $n$ is 0.

CELLULOSE ACETATE AND NYLON FIBERS CONTAINING THIOREA DYESITES

This is a continuation-in-part of copending application Ser. No. 562,512 filed July 5, 1966 now abandoned.

In order to increase the dyeability of fibers, various additives have been incorporated via, e.g., the addition of the additive to the polymer from which the fiber is extruded. Although many of these additives are effective in increasing the dyeability of the fiber, many of the fibers so treated exhibit poor retention of dyestuff ("fading"). This is due to the fact that the dyestuffs undergo changes when exposed to light and/or chemicals. Thus, e.g., the presence of nitrogen dioxide, ozone, and chlorine in the atmosphere encourages fading. It is very desirable to have a process whereby both the dyeability and the fading resistance of fibers is increased, and it is an object of this invention to provide such a process.

In accordance with this invention, there is provided a process for improving the dyeability and fading resistance of fiber, comprising mixing into said fiber prior to the time it is extruded and dried from about 0.1 to about 6 percent (by weight of fiber) of a compound of the formula

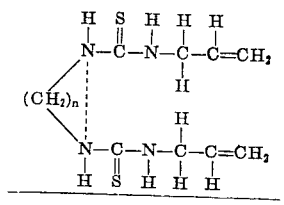

wherein $n$ is from 0 to about 18, there being a direct bond between the nitrogen atoms when $n$ is 0. There is also provided a fiber containing from about 0.1 to about 6 percent of the aforementioned compound; said fiber has good dyeability and fading resistance properties.

It has been discovered that a compound of the formula

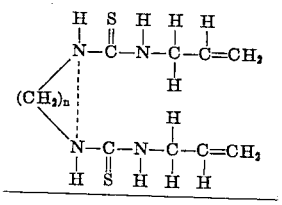

wherein $n$ is from 0 to about 18, is effective in increasing the dyeability and gas fading resistance of fibers into which it is incorporated prior to the time the fiber is extruded and dried. Some of the compounds which work well in the process of this invention include, e.g., a compound of the formula

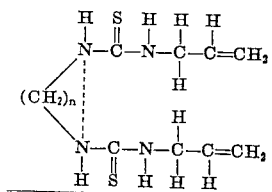

1,1-bis(allylthioureido)methane; 1,3-bis(allylthioureido)propane; 1,8-bis(allylthioureido)octane; 1,10-bis(allylthioureido)decane; 1,12-bis(allylthioureido)dodecane; 1,6-bis(allylthioureido)hexane; 1,18-bis(allylthioureido)octadecane; and the like. The most effective species occur when $n$ is 0 (in which instance there is a direct bond between the two nitrogen atoms), 3, or 6.

The thioureas of the present invention can be prepared as illustrated, e.g., by the article of Stoutland et al. appearing in the *Journal of Organic Chemistry*, Vol. 24, June, 1959, pp. 818–820. Thus, e.g., these thioureas may be prepared according to the following equation:

The preparation of some of the thioureas of this invention is illustrated in the examples.

In the process of this invention from about 0.1 to about 6 percent (based on the weight of the fiber) of the compound of this invention is mixed into the fiber prior to the time it is extruded and dried, although it is preferred to use from about 1 to about 4 percent, and it is even more preferred to use from about 2.5 to about 3 percent. The compound may be added to the polymer before the fiber is extruded, it may be added to the extruded fiber before it is dried, etc.

While a wide variety of dyestuffs are suitable for use with the shaped articles having enhanced dyeability, dyestuffs which have been found to be especially suitable are dyestuffs selected from the group consisting of acid dyestuffs and disperse dyestuffs. In general, however, the dyeing techniques or the printing techniques employed should be such as to prevent the thiourea compound which is present on or within the shaped article from undergoing thermal degradation.

The process of this invention works well with any natural or synthetic fiber. Thus, e.g., it works well with cellulose acetate fiber, cellulose triacetate fiber, acrylic fiber, modacrylic fiber, nytril fiber, olefin fiber, polyester fiber, etc. It works especially well with nylon 6 fiber (which is a nylon fiber obtained by polycondensation of caprolactam), triacetate fiber, and acetate fiber. When used with triacetate fiber, the process of this invention, in addition to imparting dyeability and fading resistance, also imparts U.V. stability to the fiber.

Some of the preferred embodiments of applicant's invention are presented in the examples set forth below. Unless otherwise stated, all parts are by weight and all temperatures are in degrees centigrade.

EXAMPLES 1–4

In these examples, the indicated amine was dissolved in either xylene or terburyl alcohol (or mixtures of these) and allyl isothiocyanate was added to the amine solution in the indicated mole ratio. Where the reaction product was a solid, it was removed by filtration, washed with xylene, and dried. Those reaction products which were oils were obtained by evaporating the solvent from the reaction mixture. The following table indicates the amine used, the nitrogen-substituted N-allylthiourea compounds which result, and their melting points. In all cases the mole ratio of allyl isothiocyanate to amine was 1.

TABLE

| Ex. | Amine used | Resultant compound | Melting point, °C. |
|---|---|---|---|
| 1 | 1,3-diamino-propane | 1,3-bis(allyl-thioureido)propane | 142 |
| 2 | 1,6-diamino-hexane | 1,6-bis(allyl-thioureido)hexane | 103 |
| 3 | hydrazine | bis(allyl-thioureido) | 180 |
| 4 | 1,2-diamino-ethane | 1,2-bis(allyl-thioureido)ethane | 95 |

When from about 2.5 to about 3 percent (by weight of fiber) of the compounds of examples 1–4 are mixed into fibers, excellent dyeability and fading resistance properties are imparted to the fibers. The product of example 3, e.g., worked exceedingly well.

EXAMPLE 5

Nylon 6 caprolactam polymer is mixed with 2 percent by weight of the compound of example 2 and extruded. The yarn produced was drawn at a ratio of 2.99 and the denier was about 50/7. A hose leg was knitted with this yarn. A first sample was dyed at 60° C. for 4 minutes with 1 percent Nylomine Blue GS and 2 percent acetic acid. A second sample is dyed at 40° C. for 7 minutes with the same ingredients. A third sample was padded with 1 g./l. acetic acid, 1 g./l. rapid wetting agent RBD (an anionic surface active agent marketed by Badische Aniline and Soda Fabrik Colors and Chemicals) and 0.5 g./l. Nylomine Blue GS. In all three cases, the yarn containing the allylthiourea derivative is much deeper than the control made of nylon 6.

EXAMPLE 6

Cellulose triacetate polymer is mixed with 2 percent by weight of the compound of example 4, and extruded. The yarn produced is woven into a fabric. An identical control fabric is also produced with the exception that the control does not contain the 2 percent by weight of said compound. The control and the treated sample are then treated as follows:

a. Dyeing
  1 percent Eastman Blue GP (Disperse Blue 3, C.I. No. 61,505), 1 g./l. Igepon T-51 (sodium N-methyl-N-oleoyl taurate marketed by G.A.F. Corporation)
  0.75 g./l. Tamol N (dispersing agent marketed by Rohm & Hass) Run 1½ hours at 95° C.

b. Printing
  1.0 percent Eastman Blue GP (Disperse Blue 3, C. I. No. 61,505), 35.5 percent water
  55.0 Keltex S (sodium alginate marketed by Kelco Co.) (3 percent), 8.0 percent phenyl glycol ethers
  0.5 percent Basogal 0 (nonionic fatty alcohol derivative marketed by Badische Aniline and Soda Fabrik Colors and Chemicals)
  print-dry-stream 1 hour at 10 p.s.i.—rinse-wash.

c. Printing
  1 percent Eastman Blue BGLF, 35.5 percent water
  55.0 percent Keltex S 3 percent, (sodium alginate marketed by Kelco Co.), 8.0 percent phenyl glycol ethers
  0.5 percent Basogal 0 (nonionic fatty alcohol derivative marketed by Badische Aniline and Soda Fabrik Colors and Chemicals)
  1 hour at 10 p.s.i.—rinse-wash.

In each case the samples containing the 2 percent by weight of said compound dyed a deeper shade. The samples dyed "$a$" and the samples printed "$b$" were subjected to the A.A.T.C.C. gas chamber test while the samples printed "$c$" were subjected to the A.A.T.C.C. ozone test. The results of both tests being given in the following in the following table.

| Sample Identification | Gas Fastness 1 cycle | Gas Fastness 2 cycles | Ozone Fastness 1 cycle | Ozone Fastness 2 cycles |
|---|---|---|---|---|
| Sample $a$ | 2-3 | 2 | — | — |
| Sample $a$ control | 2 | 1 | — | — |
| Sample $b$ | 3 | 1-2 | — | — |
| Sample $b$ control | 2 | 1 | — | — |
| Sample $c$ | — | — | 4-5 | 4 |
| Sample $c$ control | — | — | 4 | 3-4 |

The ozone test was conducted according to the testing procedures set forth in A.A.T.C.C. 109-1963T. The procedure set forth in this test method is in brief an analysis wherein a treated specimen and an untreated specimen are simultaneously exposed to an atmosphere containing ozone until a control sample shows a color change corresponding to that of a standard of fading. This exposure period constitutes one cycle. Cycles are repeated from one to nine times. The control sample consists of a medium shade of gray acetate fabric prepared by dyeing in a tertiary shade with Disperse Blue 27, Disperse Red 35, and Disperse Yellow 37. The control sample is exposed until a color change, which is mainly loss of blue to that of the standard, is obtained. The standard of fading is an acetate fabric dyed with Disperse Blue 27, Disperse Red 35 and Disperse Yellow 37. The effect on color of the test specimens after three cycles and nine cycles are given by reference to the International Geometric Gray Scale wherein the readings are as follows:

Class 5—Negligible or no change as shown in Gray Scale step 5.
Class 4—A change in color equivalent to Gray Scale step 4.
Class 3—A change in color equivalent to Gray Scale step 3.
Class 2—A change in color equivalent to Gray Scale step 2.
Class 1—A change in color equivalent to Gray Scale step 1.

The gas fading test was conducted according to the procedure set forth in A.A.T.C.C. 23-1962. The procedure set forth in this test method is in brief an analysis wherein a treated test specimen and an untreated test specimen are simultaneously exposed to a gaseous atmosphere generated by the combustion products of a gas burner until a control sample shows a color change corresponding to that of a standard of fading. The remaining portion of the procedure is similar to the ozone test which has previously been described.

As can be noted from the data given in the table, the samples containing thiourea and having the resultant deep dyeing properties, have gas fastness and ozone fading properties which are superior to similar samples which do not contain thiourea.

Although the above examples and descriptions of this invention have been very specifically illustrated, many other modifications will suggest themselves to those skilled in the art on a reading of this disclosure. These are intended to be comprehended within the scope of this invention.

What is claimed is:

1. A process for improving the dyeability and fading resistance of fiber selected from the group consisting of cellulose acetate fiber, cellulose triacetate fiber, nylon fiber, comprising the step of mixing into said fiber prior to the time it is extruded and dried from about 0.1 to about 6 percent (by weight of fiber) of a compound of the formula

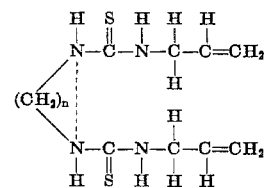

wherein $n$ is from 0 to about 18, there being a direct bond between the nitrogen atoms when $n$ is 0.

2. The process of claim 1, wherein:
  a. said fiber is selected from the group consisting of cellulose triacetate fiber, cellulose acetate fiber, and nylon fiber; and
  b. $n$ is an integer from 0 to about 6.

3. The process of claim 2, wherein said fiber is cellulose triacetate fiber.

4. The process of claim 3, wherein $n$ is 0.

5. The process of claim 3, wherein $n$ is 3.

6. The process of claim 3, wherein $n$ is 6.

7. A fiber selected from the group consisting of cellulose acetate fiber, cellulose triacetate fiber, nylon fiber, said fiber being comprised of from about 0.1 to about 6 percent of the compound of claim 1.

8. The fiber of claim 7, wherein $n$ is an integer of from 0 to about 6 and said fiber is cellulose triacetate fiber.

* * * * *

UNITED STATES PATENT OFFICE
CERTIFICATE OF CORRECTION

Patent No. 3,632,363                Dated January 4, 1972

Inventor(s) Francis S. Moussalli

It is certified that error appears in the above-identified patent and that said Letters Patent are hereby corrected as shown below:

Column 1, the formula beginning at line 54 should be corrected to read:

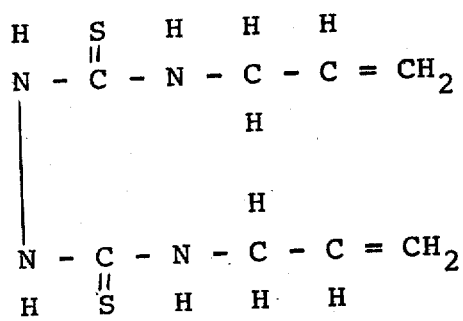

Column 1, line 73, after the word "equation:" insert the following:

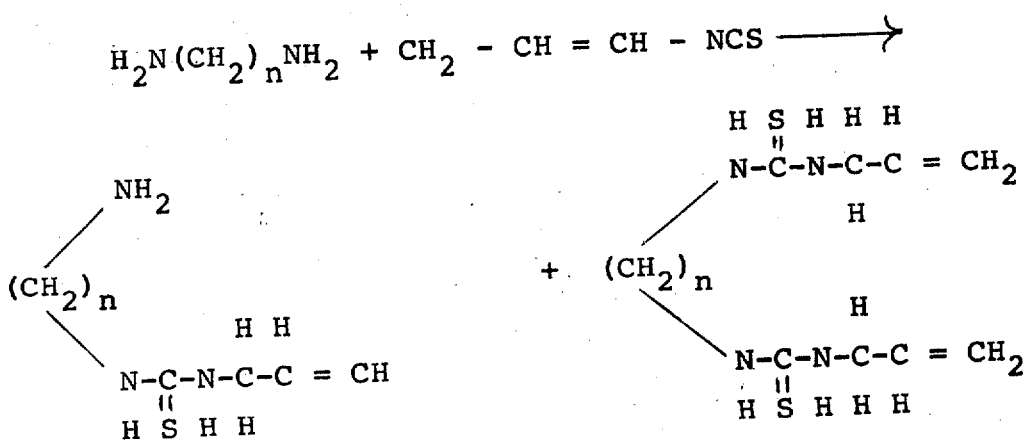

PO-1050
(5/69)

UNITED STATES PATENT OFFICE
CERTIFICATE OF CORRECTION

Patent No. 3,632,363   Dated January 4, 1972

Inventor(s) Francis S. Moussalli   PAGE - 2

It is certified that error appears in the above-identified patent and that said Letters Patent are hereby corrected as shown below:

Column 3, line 39, before "1 hour" insert ---Print-dry-steam ---.

Column 3, line 60, insert the word ---test--- before the word "specimen", each occurrence.

Signed and sealed this 30th day of May 1972.

(SEAL)
Attest:

EDWARD M. FLETCHER, JR.
Attesting Officer

ROBERT GOTTSCHALK
Commissioner of Patents